US012562166B1

(12) United States Patent
Iyengar

(10) Patent No.: US 12,562,166 B1
(45) Date of Patent: Feb. 24, 2026

(54) VISUAL INTERACTIVE VOICE RESPONSE KEY MAPPING

(71) Applicant: Zoom Communications, Inc., San Jose, CA (US)

(72) Inventor: Hemambika Pappanallore Iyengar, Plano, TX (US)

(73) Assignee: Zoom Communications, Inc., San Jose, CA (US)

( * ) Notice: Subject to any disclaimer, the term of this patent is extended or adjusted under 35 U.S.C. 154(b) by 180 days.

(21) Appl. No.: 18/486,466

(22) Filed: Oct. 13, 2023

(51) Int. Cl.
| | |
|---|---|
| *H04M 3/51* | (2006.01) |
| *G06F 3/0488* | (2022.01) |
| *G10L 15/22* | (2006.01) |

(52) U.S. Cl.
CPC ............ *G10L 15/22* (2013.01); *G06F 3/0488* (2013.01); *H04M 3/5166* (2013.01); *H04M 2201/40* (2013.01); *H04M 2201/42* (2013.01)

(58) Field of Classification Search
None
See application file for complete search history.

(56) References Cited

U.S. PATENT DOCUMENTS

| | | | |
|---|---|---|---|
| 8,073,699 B2 | 12/2011 | Michelini et al. | |
| 10,728,376 B2 | 7/2020 | Bi et al. | |
| 2013/0094633 A1* | 4/2013 | Mauro ................ | H04M 7/0039 |
| | | | 379/88.01 |
| 2018/0146090 A1* | 5/2018 | Lavian ................. | H04M 3/493 |
| 2021/0250438 A1* | 8/2021 | Lu ........................ | G06F 3/0482 |
| 2023/0066100 A1* | 3/2023 | Cherukara ............. | G10L 15/22 |
| 2024/0040039 A1* | 2/2024 | Barbello ............. | H04M 3/4931 |
| 2025/0106321 A1* | 3/2025 | Reyes .................... | G10L 13/08 |

FOREIGN PATENT DOCUMENTS

WO        2020005302 A1      1/2020

* cited by examiner

*Primary Examiner* — Nafiz E Hoque
(74) *Attorney, Agent, or Firm* — Young Basile Hanlon & MacFarlane, P.C.

(57) ABSTRACT

A telephony system generates a graphical user interface (GUI) keypad that includes one or more options detected in an audio stream from an interactive voice response (IVR) system. The telephony system detects speech associated with the IVR system in the audio stream and parses the speech to determine one or more options. The telephony system maps each option to a respective key on the GUI keypad. The system generates the GUI keypad such that it includes a representation of each option on a respective key of the GUI keypad.

20 Claims, 11 Drawing Sheets

900

902 — DETECT RECORDED VOICE DATA WITHIN AUDIO STREAM

904 — DETERMINE THAT RECORDED VOICE DATA IS ASSOCIATED WITH IVR SYSTEM

906 — PARSE RECORDED VOICE DATA TO EXTRACT ONE OR MORE MENU OPTIONS

908 — MAP EACH MENU OPTION TO A RESPECTIVE KEY ON A GUI KEYPAD

910 — OUTPUT GUI KEYPAD

VISUAL INTERACTIVE VOICE RESPONSE KEY MAPPING

FIELD

This disclosure generally relates to telephony systems, and, more specifically, to telephony systems that generate a graphical user interface (GUI) based on detected interactive voice response (IVR) recorded voice data.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
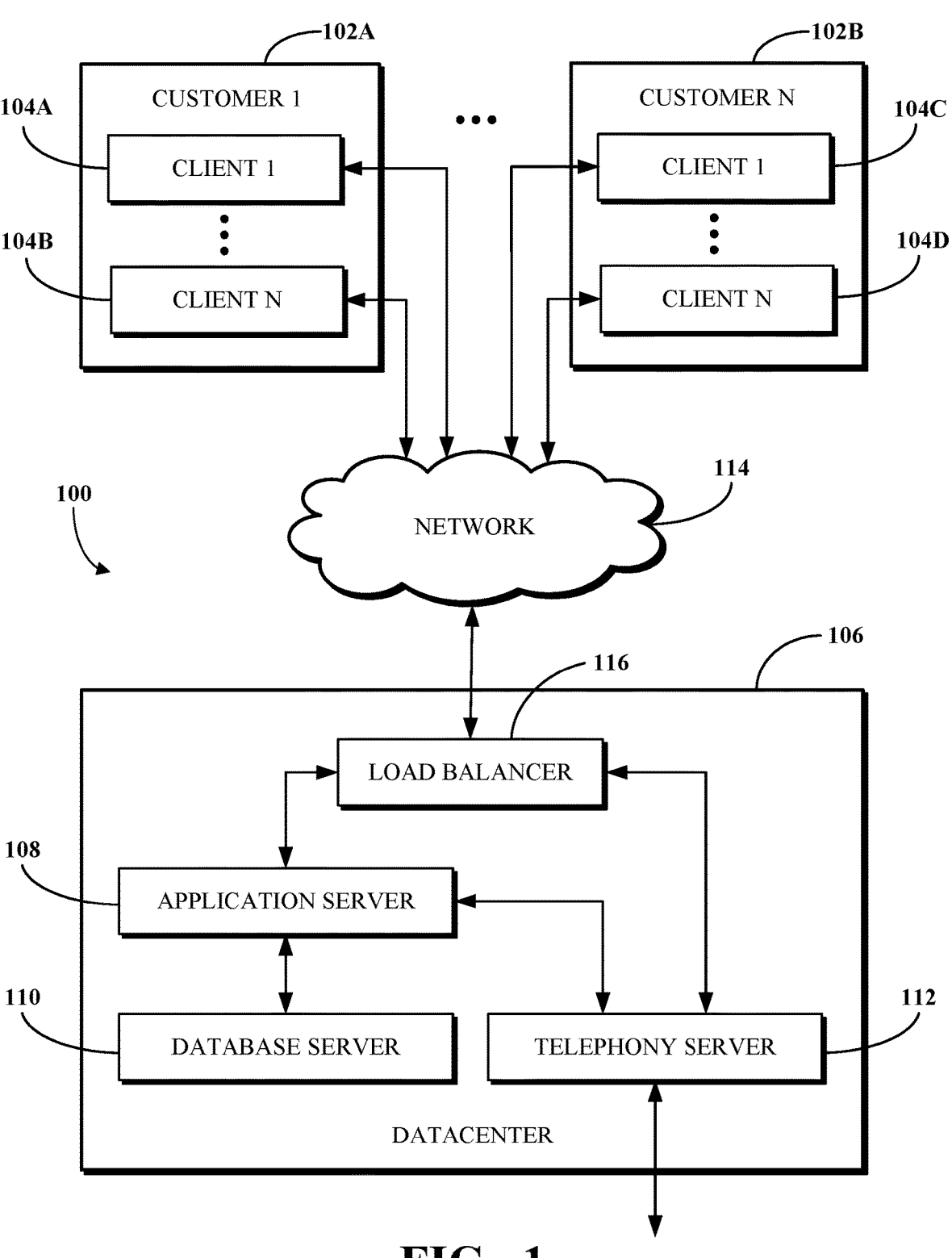
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them. One solution is by way of a unified communications as a service (UCaaS) platform, which includes several communications services integrated over a network, such as the Internet, to deliver a complete communication experience regardless of physical location.

When an operator of a calling device (e.g., a mobile device, a physical phone, or a computer) makes a call, the call is received by a telephony system (e.g., associated with a UCaaS platform) and routed to a destination. In some cases, the destination may present an IVR menu including options (e.g., press 1 for sales, 2 for support, etc.) for selection by the caller, such as to route the call to an appropriate party. Traditionally, the IVR menu options are audibly communicated to the caller via a handset or speaker of the client device. However, callers often forget some or all of the menu options and may need the menu to be repeated before they identify the response to enter. In some cases, a menu option may be inaudible or read by the recording in a strange way such that the caller erroneously ignores or misinterprets it.

One approach to address these issues with a traditional IVR service is to visually present the IVR menu options to the caller. For example, the client device from which a call is placed may include a display, and visualizations of the menu options may be output for viewing by the caller at the display. However, existing solutions which use visual IVR require pre-population of the IVR menu options within a data store. Then during a call, those pre-populated IVR menu options are retrieved from the data store and processed to cause the visualizations at the display of the caller's device.

Implementations of this disclosure address problems such as these by connecting a call from a client device to a destination having an IVR service, transcribing audio from the destination to identify menu options of the IVR service, mapping one or more menu options of an IVR tree to a respective key on a GUI keypad, generating the GUI keypad with keys representing the menu options, and outputting the GUI keypad to a display associated with the client device. As used herein, the term "destination" includes, but is not limited to, a service being called by the client device and any hardware used to implement the service. As used herein, the term "IVR tree" includes, but is not limited to, a phone tree with two or more branches of pre-recorded messages that is used to direct calls to the correct destination.

A telephony system creates a GUI keypad with keys associated with an IVR menu which can be output to a display available to a caller. A process (e.g., a real-time transcription process, such as an automated speech recognition (ASR) process which performs natural language processing against speech in one or more languages) listens to audio coming through the call from either end (i.e., from the telephony system or from the caller). It is noted that while the description refers to an "ASR process" or "ASR processing," the operation of embodiments and implementations would remain the same if another real-time transcription process were performed. The ASR process generates a GUI keypad with keys associated with the IVR menu options based on the transcription of audio sent from the destination called by the caller to a device of the caller. For example, when an operator places a call through a telephony system, the telephony system locates the service connected to the number and performs a real-time transcription to determine what is being said in an IVR menu option. The telephony system then sends a signal to display that information visually to the caller at their client device (e.g., a visual prompt representing text corresponding to the IVR menu option). The same would apply if the call is outside of the telephony system (e.g., to an external telephony system), such as where the call goes through the telephony system to connect to the external telephony system, which may have its own IVR system. The telephony system in such a case would act as an intermediary to translate the audible IVR to display it visually for the caller. In one use case, the client device is registered with the telephony system and/or a software platform associated therewith, for example, the UCaaS platform.

In some cases, where the client device is a non-video-enabled phone (e.g., a desktop phone), the visual properties could be extended to a secondary device associated with the same caller (e.g., as known to the telephony system). For example, a channel can be opened with a video-enabled device registered with the caller responsive to a determination that the device from which the call is placed is not video-enabled.

In a use case, the destination may be or be associated with a contact center. The telephony system detects recorded voice data in the audio stream from the contact center and determines that the recorded voice data is associated with a contact center device, such as a server of the contact center. The telephony system transcribes the audio stream from the contact center and determines that the recorded voice data is associated with an IVR system. The telephony system identifies one or more IVR menu options of an IVR tree of the contact center and generates a GUI keypad. Each key of the GUI keypad includes a representation of a respective identified IVR menu option. The representation may include a text overlay of an identified IVR menu option, an image overlay of an identified IVR menu option, or another representation of an IVR menu option. For example, if the telephony system determines that the "4" key is associated with an IVR menu option for "Account Inquiry," the telephony system may generate the GUI keypad where the "4" key includes a textual representation of "Account Inquiry." In another example, when the telephony system determines that the "4" key is associated with an IVR menu option for "Account Inquiry," the telephony system may generate the GUI keypad that includes a textual representation of "Account Inquiry" (i.e., without including the "4" to provide a less cluttered interface).

In a use case, the call is routed through an external telephony system and the audio stream is received by the telephony system. The telephony system listens to all of the audio stream, and sends the audio stream to the client device together with the GUI keypad with keys associated with the IVR menu options for display. In some implementations, the IVR prompt information is returned through the external telephony system to the client device and the client device then sends the audio stream to the telephony system for natural language processing, and the GUI keypad with keys associated with the IVR menu options are returned to the client device for display. In this way, the client device operates as an intermediary between the telephony system and the external telephony system. In some implementations, a channel can be created directly between the telephony system and the external telephony system so that the client device is not used as an intermediary. This would be useful where the client device is not registered with telephony system, but calls into a destination with IVR, and where the call maintains access to the external telephony system.

In a use case, a similar transcription process may be used to provide an image or a video of the visualized IVR menu options. The endpoint display of the client device may still show text options or buttons so the caller does not have to memorize the IVR menu options. In some such cases, a threshold check may be performed to determine if the client device is video-enabled before sending a video-based version of the IVR menu options.

To describe some implementations in greater detail, reference is first made to examples of hardware and software structures used to implement a system for generating and transmitting a GUI keypad with keys associated with an IVR menu. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
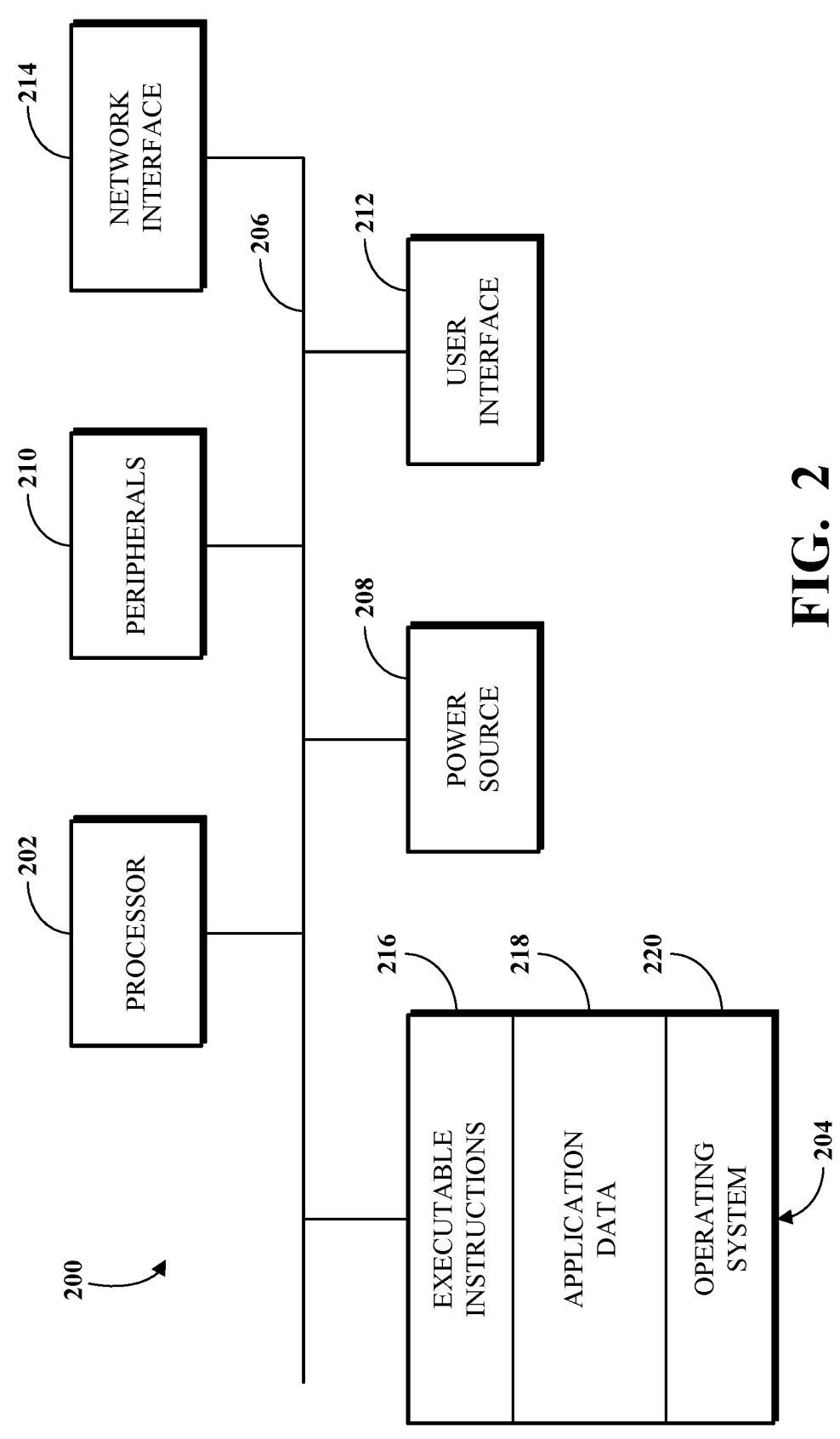
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input inter-faces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
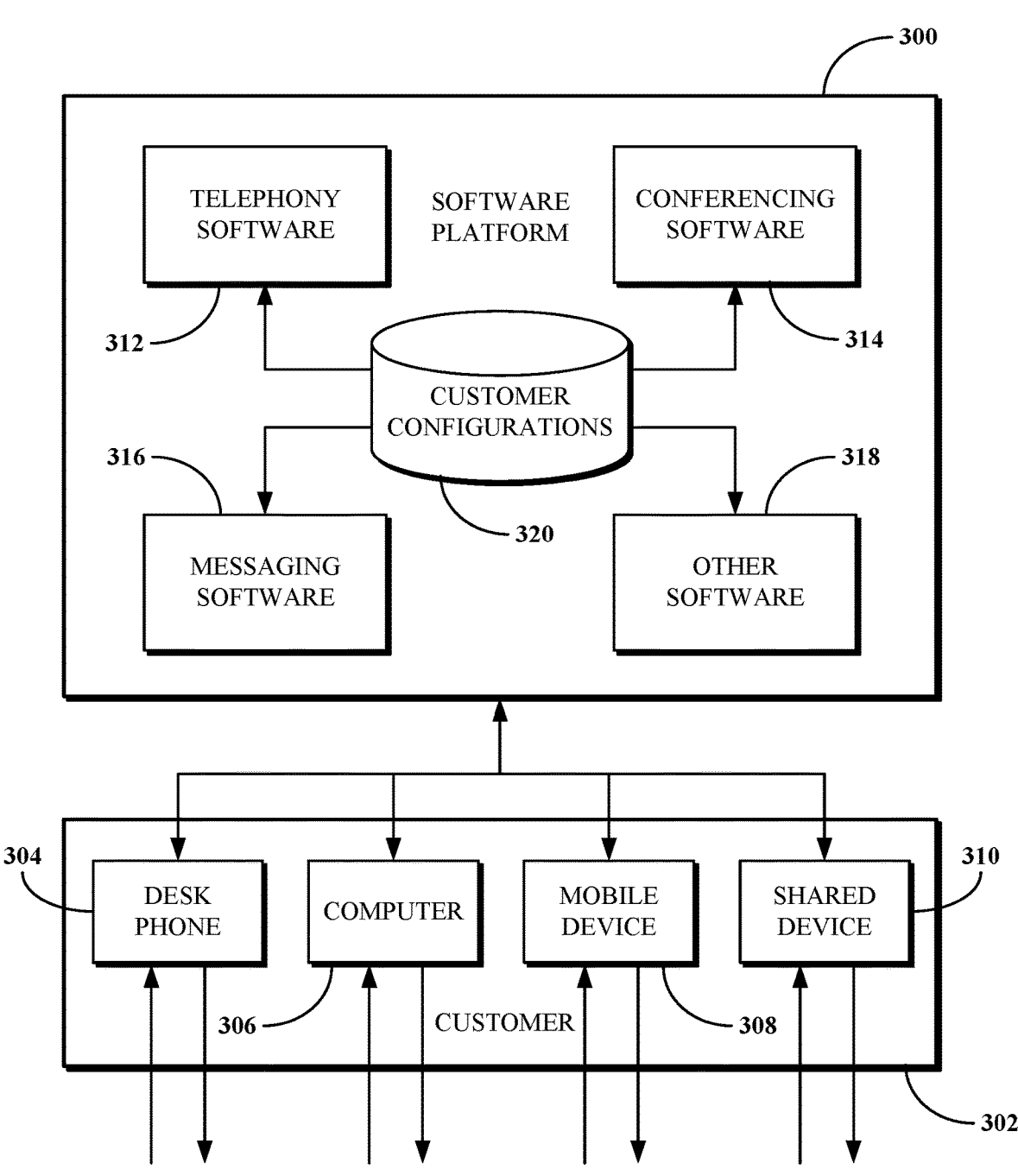
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software configured to transcribe, in real-time, an audio stream of a call from a destination to detect IVR menu options and to transmit a GUI keypad with keys associated with the IVR menu options for display at a client device or other associated device. In some such cases, the telephony software 312 can include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
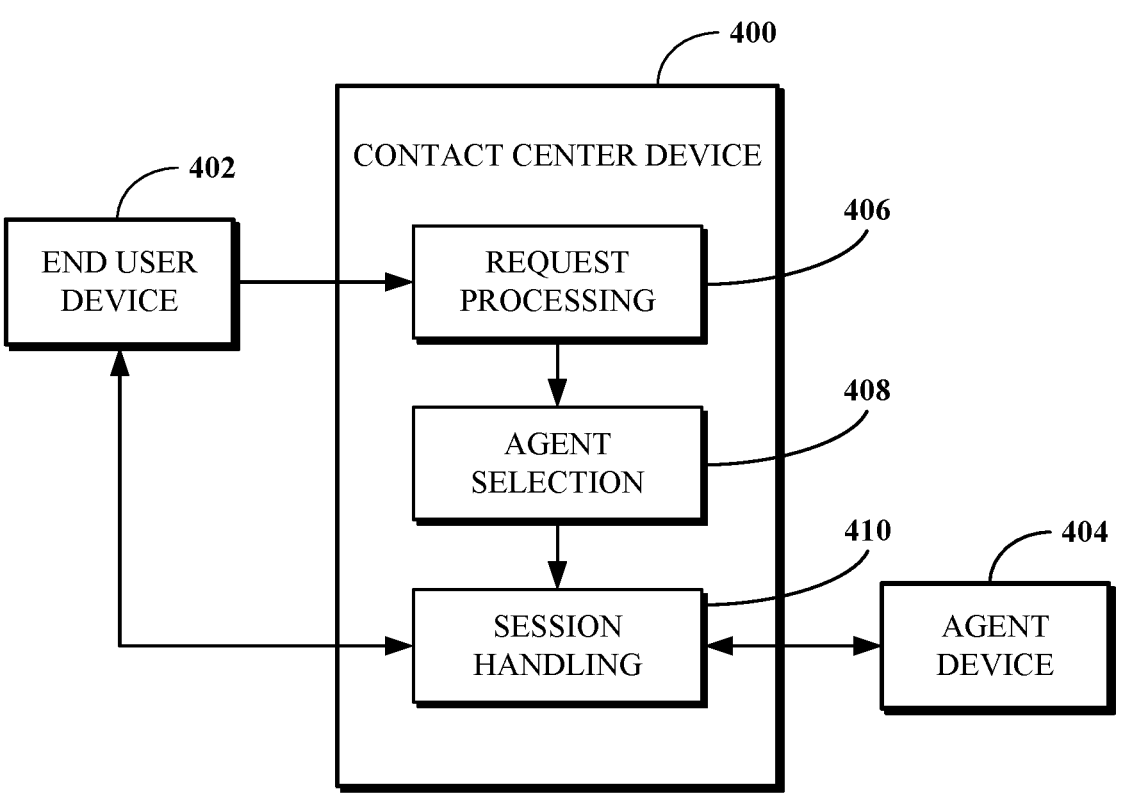
FIG. 4 is a block diagram of an example of a contact center system.

FIG. 4 is a block diagram of an example of a contact center system. A contact center device 400, which in some cases may be implemented in connection with a software platform (e.g., the software platform 300 shown in FIG. 3), is accessed by a user device 402 and used to establish a connection between the user device 402 and an agent device 404 over one of multiple modalities available for use with the contact center device 400, for example, telephony, video, text messaging, chat, and social media. The contact center device 400 is implemented using one or more servers and software running thereon. For example, the contact center device 400 may be implemented using one or more of the servers 108 through 112 shown in FIG. 1, and may use communication software such as or similar to the software 312 through 318 shown in FIG. 3. The contact center device 400 includes software for facilitating contact center engagements requested by user devices such as the user device 402. As shown, the software includes request processing software 406, agent selection software 408, and session handling software 410.

The request processing software 406 processes a request for a contact center engagement initiated by the user device 402 to determine information associated with the request. The request may include a natural language query or a request entered in another manner (e.g., "press 1 to pay a bill, press 2 to request service"). The information associated with the request generally includes information identifying the purpose of the request and which is usable to direct the request traffic to a contact center agent capable of addressing the request. The information associated with the request may include information obtained from a user of the user device 402 after the request is initiated. For example, for the telephony modality, the request processing software 406 may use an IVR menu to prompt the user of the user device to present information associated with the purpose of the request, such as by identifying a category or sub-category of support requested. In another example, for the video modality, the request processing software 406 may use a form or other interactive user interface to prompt a user of the user device 402 to select options which correspond to the purpose of the request. In yet another example, for the chat modality, the request processing software 406 may ask the user of the user device 402 to summarize the purpose of the request (e.g., the natural language query) via text and thereafter process the text entered by the user device 402 using natural language processing and/or other processing.

The session handling software 410 establishes a connection between the user device 402 and the agent device 404, which is the device of the agent selected by the agent selection software 408. The particular manner of the connection and the process for establishing the same may be based on the modality used for the contact center engagement requested by the user device 402. The contact center engagement is then facilitated over the established connection. For example, facilitating the contact center engagement over the established connection can include enabling the user of the user device 402 and the selected agent associated with the agent device 404 to engage in a discussion over the subject modality to address the purpose of the request from the user device 402. The facilitation of the contact center engagement over the established connection can use communication software implemented in connection with a software platform, for example, one of the software 312 through 318, or like software.

The user device 402 is a device configured to initiate a request for a contact center engagement which may be obtained and processed using the request processing software 406. In some cases, the user device 402 may be a client device, for example, one of the clients 304 through 310 shown in FIG. 3. For example, the user device 402 may use a client application running thereat to initiate the request for the contact center engagement. In another example, the connection between the user device 402 and the agent device 404 may be established using software available to a client application running at the user device 402. Alternatively, in some cases, the user device 402 may be other than a client device.

The agent device 404 is a device configured for use by a contact center agent. Where the contact center agent is a human, the agent device 404 is a device having a user interface. In some such cases, the agent device 404 may be a client device, for example, one of the clients 304 through 310, or a non-client device. In some such cases, the agent device 404 may be a server which implements software usable by one or more contact center agents to address contact center engagements requested by contact center users. Where the contact center agent is a non-human, the agent device 404 is a device that may or may not have a user interface. For example, in some such cases, the agent device 404 may be a server which implements software of or otherwise usable in connection with the contact center device 400.

Although the request processing software 406, the agent selection software 408, and the session handling software 410 are shown as separate software components, in some implementations, some or all of the request processing software 406, the agent selection software 408, and the session handling software 410 may be combined. For example, the contact center device 400 may be or include a single software component which performs the functionality of all of the request processing software 406, the agent selection software 408, and the session handling software 410. In some implementations, one or more of the request processing software 406, the agent selection software 408, or the session handling software 410 may be comprised of multiple software components. In some implementations, the contact center device 400 may include software components other than the request processing software 406, the agent selection software 408, and the session handling software 410, such as in addition to or in place of one or more of the request processing software 406, the agent selection software 408, and the session handling software 410.

Figure 5:
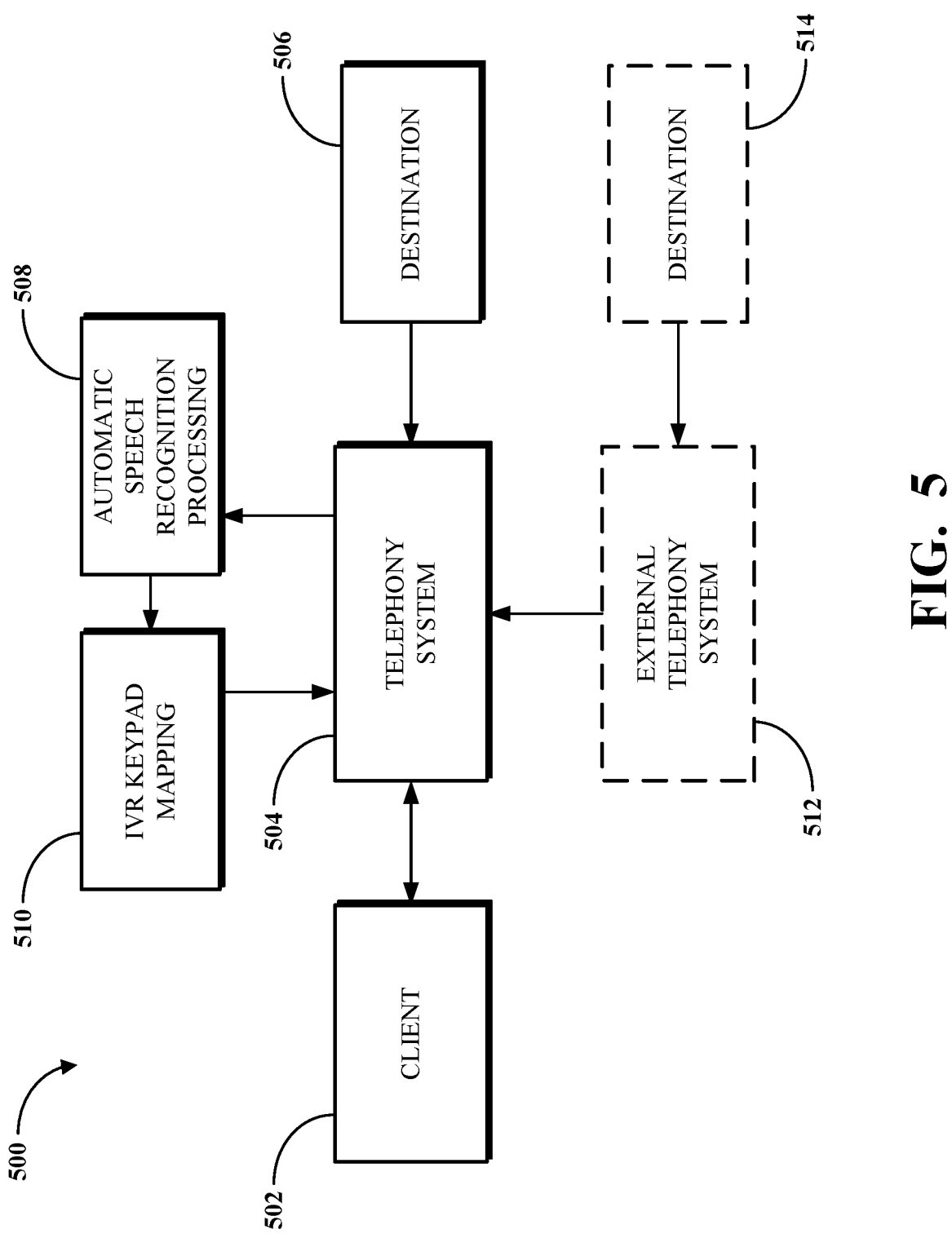
FIG. 5 is a block diagram of a system to display a GUI keypad with keys that are associated with IVR menu options.

FIG. 5 is a block diagram of a system 500 to display a GUI keypad with keys that are associated with IVR menu options. In the system 500, a client device 502 communicates with a telephony system 504. An operator of the client device 502 may place a call through the telephony system 504 to connect the client device 502 to a destination 506. In an example, the destination 506 may be a contact center device, such as the contact center device 400 shown in FIG. 4. The destination 506 has or otherwise uses an IVR system. The IVR system sends an audio stream including the IVR menu options from the destination 506 to the telephony system 504. An ASR processing tool 508 performs real-time speech recognition processing on the audio stream to detect recorded voice data and identify the IVR menu options. In some implementations, the ASR processing tool 508 is a component of the telephony system 504 and is contained within the telephony system 504. In some implementations, the ASR processing tool 508 is a separate component in communication with the telephony system 504. The operation of the system 500 does not change based on the location of the ASR processing tool 508.

The identified IVR menu options are sent from the ASR processing tool 508 to a IVR keypad mapping tool 510. The IVR keypad mapping tool 510 generates a GUI keypad that includes keys by mapping each identified IVR menu option with a respective key. The keys of the GUI keypad are user interface elements used to obtain an input, such as a touch input, from an operator of the client device 502 and may include a visual prompt, text, a text box, an image including the text, another visual indication of the content of the identified IVR menu options, or a combination thereof. The GUI keypad is sent as a set of instructions for mapping keys of the GUI keypad to IVR menu options and rendering the GUI keypad at the client device 502 from the IVR keypad mapping tool 510 to the telephony system 504. The telephony system 504 then sends the set of instructions for mapping keys of the GUI keypad to IVR menu options and rendering the GUI keypad to the client device 502 for display on the client device 502. In some implementations, the IVR keypad mapping tool 510 sends the set of instructions for mapping keys of the GUI keypad to IVR menu options and rendering the GUI keypad directly to the client device 502. In some implementations, the IVR keypad mapping tool 510 is a component of the telephony system 504 and is contained within the telephony system 504. In some implementations, the IVR keypad mapping tool 510 is separate from the telephony system 504 but remains in communication with the ASR processing tool 508 and the telephony system 504. The operation of the system 500 does not change based on the location of the IVR keypad mapping tool 510.

The client device 502 is configured to display the GUI keypad including all of the IVR menu options. The client device 502 may display the GUI keypad using software native to the client device 502 used to place a call or a client application associated with the software platform. In some implementations, where a number of the keys of the GUI keypad generated based on the IVR menu options exceeds a maximum number of keys which can be displayed at one time, such as based on a size of the keys, a scrollable user interface element may be used at the client device 502 to enable an operator of the client device 502 to browse through all of the keys of the GUI keypad. In some implementations, keys that are not mapped to an IVR menu option may be included in the GUI keypad along with the keys that are mapped to an IVR menu option. In some implementations, only the keys that are mapped to an IVR menu option may be included in the GUI keypad. For example, if three keys are mapped to IVR menu options, the GUI keypad may only include those three keys to reduce clutter on the display. In some implementations, dimensions of the keys displayed at the client device 502 may be scaled at the client device 502 according to a number of the keys generated by the IVR keypad mapping tool 510. For example, in one case, an IVR menu includes two or three IVR menu options and thus two or three keys are mapped and generated, in which those two or three keys may each be represented using a first size. In another case, an IVR menu includes fourteen or fifteen IVR menu options and thus fourteen or fifteen keys are mapped and generated, in which those eight or nine keys may each be represented using a second size. Because there are more keys to display at once in the latter case, the second size is smaller than the first size. In some implementations, and regardless of whether the keys are scaled or browsed using a scrollable user interface element, the keys generated for a set of IVR menu options that may be displayed in various sizes. For example, a first key of a first IVR menu option may be visually represented in a first size and a second key of a second IVR menu option may be visually represented in a second size different from the first size.

In some implementations, after one IVR menu option has been identified from the audio stream by the ASR processing tool 508, the identified IVR menu option is sent to the IVR keypad mapping tool 510. In some implementations, more than one or all of the IVR menu options are identified from the audio stream by the ASR processing tool 508 before being sent to the IVR keypad mapping tool 510.

In some implementations, the system 500 may be in communication with an external telephony system 512, which can communicate with the client device 502 via the telephony system 504. The external telephony system 512 can connect a caller using the client device 502 to a destination 514. The destination 514 has an associated external IVR system. In this implementation, the external IVR system sends an audio stream including the IVR menu options from the destination 514 to the external telephony system 512. The external telephony system 512 routes the audio stream to the telephony system 504 and the audio stream is processed in a similar manner as described above for the audio stream from the IVR system associated with the destination 506 to identify the IVR menu options and to generate GUI keypads with keys associated with the IVR menu options to be output for display at the client device 502.

In some implementations, the system 500 can include a translation tool that translates the ASR processing tool 508 and the IVR keypad mapping tool 510. For example, the translation tool can include functionality, implemented using a machine learning (ML) model, an artificial intelligence (AI) model, a translation service native to the software platform which implements the system 500, or a translation service external to the software platform, for translating the IVR menu options identified by the ASR processing tool 508 from a first language in which the IVR menu options are identified to a second language in which to output the GUI keypad with keys associated with those IVR menu options, such as at the client device 502. The translated IVR menu options may then be processed using the IVR keypad mapping tool 510 to generate GUI keypads with keys associated with those IVR menu options in the second language.

Figure 6A:
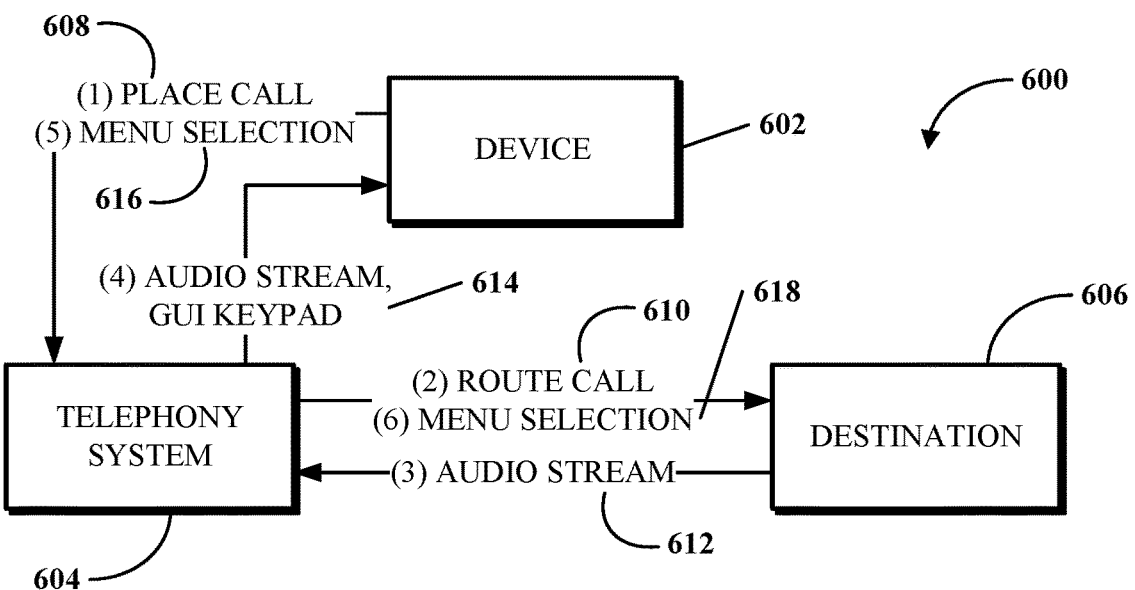
FIG. 6A is a flow diagram of a system to display a GUI keypad with keys that are associated with IVR menu options.

FIG. 6A is a flow diagram of a system 600 to display a GUI keypad with keys that are associated with IVR menu options. The system 600 includes a device 602, a telephony system 604, and a destination 606, which may, for example, respectively be the client device 502, the telephony system 504, and the destination 506 shown in FIG. 5. An operator of the device 602 places a call (operation 608). The telephony system 604 receives the call from the device 602 and routes the call to the destination 606 (operation 610). The destination 606 sends an audio stream including the IVR menu options to the telephony system 604 (operation 612). The telephony system 604 performs ASR processing to detect recorded audio data, identify the IVR menu options, and create the GUI keypad with keys associated with the IVR menu options from the audio stream, and routes both the audio stream and the GUI keypad with keys associated with the IVR menu options to the device 602 (operation 614). In some cases, each key of the GUI keypad is sent to the device 602 one at a time as they are identified by the ASR processing. In other cases, the GUI keypad is sent to the device 602 as a whole, which may be determined by the end of ASR processing. In some instances, the end of ASR processing may be determined by a threshold period of silence elapsing during processing.

In some implementations, one or more keys of the GUI keypad can include text, a text box, an image including the text, or other visualization of the content of the identified IVR menu option. In some implementations, the telephony system 604 stores the GUI keypads, to resend the IVR menu options to the device 602 during the current call if requested by the client device or to send the IVR menu options to the device 602 or a different client device for a separate call placed to the same destination 606.

In some implementations, before the GUI keypad is sent to the device 602, a determination is made of the capabilities of the client device 602. For example, a determination may be made whether the device 602 can display the GUI keypad or whether the device 602 is capable of displaying a video or an image. In a situation where the device 602 cannot display the GUI keypad, the telephony system 604 may identify another device associated with the caller and that is known to the telephony system 604 to be able to display the GUI keypad. This identification and association may be based on matching operator name information or other information associated with the device 602. In such a case, the GUI keypad is output for display at the other device instead of at the device 602. In a situation where the device 602 can display a video, the output to the device 602 may be in video form if such video form was generated based on the identified IVR menu options.

After the GUI keypad with keys associated with the IVR menu options has been output to the display of the device 602, an operator of the device 602 selects one of the menu options. The menu selection is transmitted from the device 602 to the telephony system 604 (operation 616) and transmitted from the telephony system 604 to the destination 606 (operation 618).

Figure 6B:
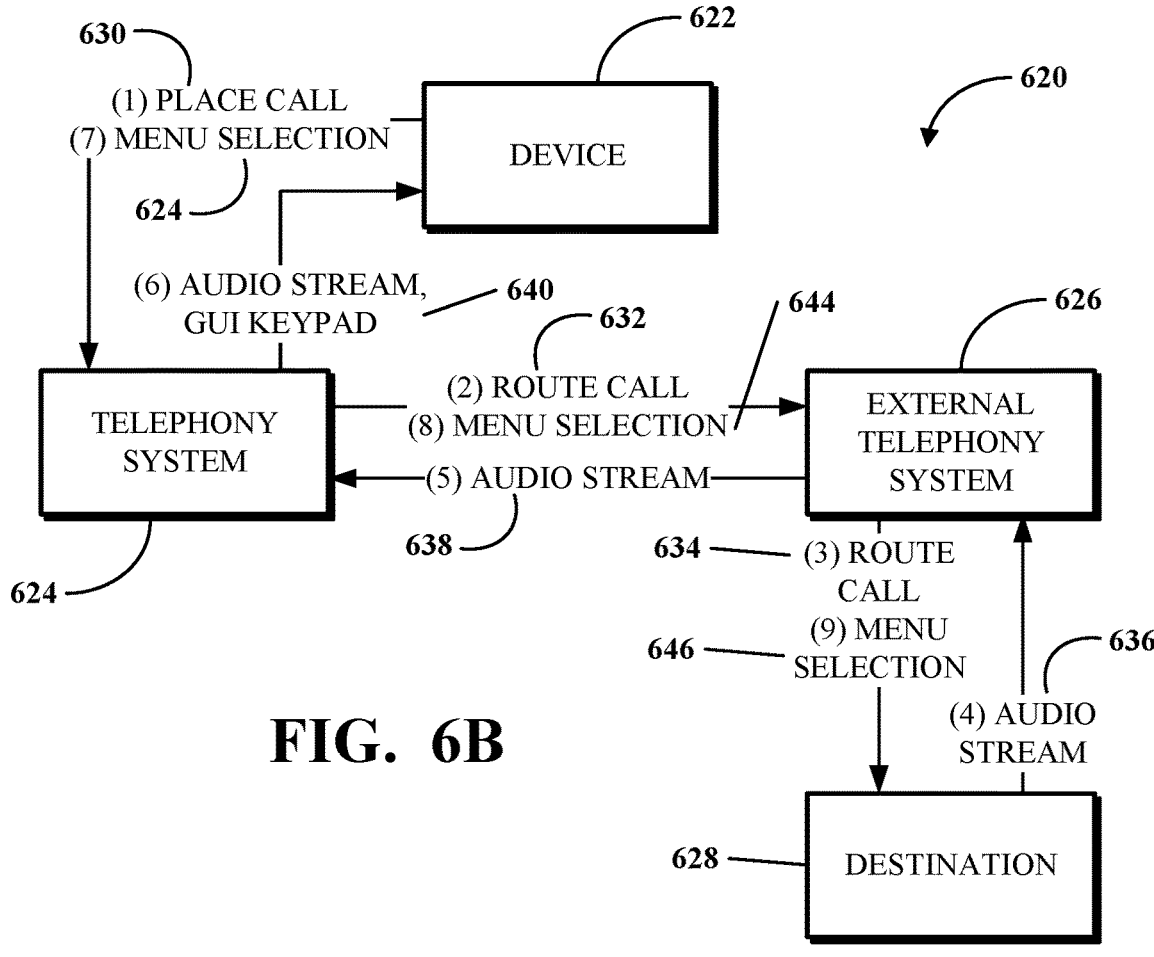
FIG. 6B is a flow diagram of an alternate system to display a GUI keypad with keys that are associated with IVR menu options.

FIG. 6B is a flow diagram of an alternate system 620 to display a GUI keypad with keys that are associated with IVR menu options. The system 620 includes a device 622, a telephony system 624, an external telephony system 626, and a destination 628, which may, for example, respectively be the client device 502, the telephony system 504, the external telephony system 512, and the destination 514 shown in FIG. 5. An operator of the device 622 places a call (operation 630). The telephony system 624 receives the call from the device 622 and routes the call to the external telephony system 626 (operation 632). The external telephony system 626 routes the call to the destination 628 (operation 634).

The destination 628 sends an audio stream including the IVR menu options to the external telephony system 626 (operation 636). The external telephony system 626 routes the audio stream to the telephony system 624 (operation 638). The telephony system 624 performs ASR processing to detect recorded audio data in the audio stream, identify the IVR menu options, and create the GUI keypad with keys associated with the IVR menu options from the audio stream, and routes both the audio stream and the GUI keypad with keys associated with the IVR menu options to the device 622 (operation 640). In some cases, the keys of the GUI keypad are sent to the device 622 one at a time as they are identified by the ASR processing. In other cases, the GUI keypad is sent to the device 522 as a whole, which may be determined by the end of ASR processing. In some instances, the end of ASR processing may be determined by a threshold period of silence elapsing during processing.

In some implementations, each key associated with an IVR menu option includes text, a text box, an image including the text, and/or another visualization of the content of the identified IVR menu option. In some implementations, the telephony system 624 stores the GUI keypads with keys associated with the IVR menu options, to resend the IVR menu options to the device 622 during the current call or to send the IVR menu options to the device 622 or a different device for a separate call placed to the same destination 628.

In some implementations, before the GUI keypad is sent to the device 622, a determination is made of the capabilities of the device 622. For example, a determination may be made whether the device 622 can display the GUI keypad or whether the device 622 is capable of displaying a video or an image. In a situation where the device 622 cannot display the GUI keypad, the telephony system 624 may identify another device associated with the caller and that is known to the telephony system 624 to be able to display the visualizations. This identification and association may be based on matching operator name information or other information associated with the device 622. In such a case, the GUI keypad is output for display at the other device instead of at the device 622. In a situation where the device 622 can display a video, the output to the device 622 may be in video form if such video form was generated based on the identified IVR menu options.

After the GUI keypad is output to the display of the device 622, an operator of the device 622 selects one of the menu options. The menu selection is transmitted from the device 622 to the telephony system 624 (operation 642), transmitted from the telephony system 624 to the external telephony system 626 (operation 644), and transmitted from the external telephony system 626 to the destination 628 (operation 646).

Figure 6C:
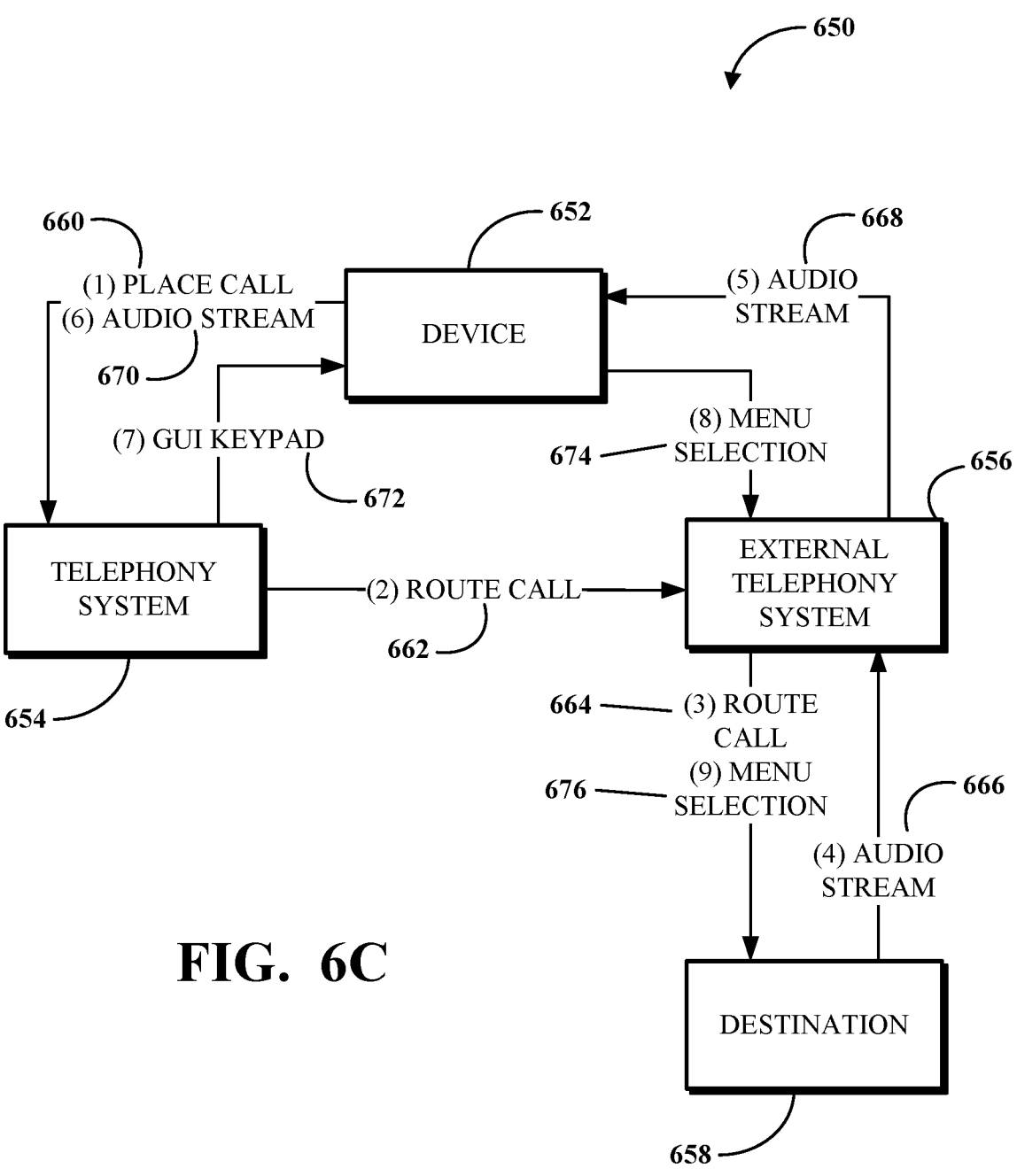
FIG. 6C is a flow diagram of another alternate system to display a GUI keypad with keys that are associated with IVR menu options.

FIG. 6C is a flow diagram of another alternate system 650 to display a GUI keypad with keys that are associated with IVR menu options. The system 650 includes a device 652, a telephony system 654, an external telephony system 656, and a destination 658, which may, for example, respectively be the client device 502, the telephony system 504, the external telephony system 512, and the destination 514 shown in FIG. 5. An operator of the device 652 places a call (operation 660). The telephony system 654 receives the call from the device 652 and routes the call to the external telephony system 656 (operation 662). The external telephony system 656 routes the call to the destination 658 (operation 664).

The destination 658 sends an audio stream including the IVR menu options to the external telephony system 656 (operation 666). The external telephony system 656 routes the audio stream to the device 652 (operation 668). The client device 652 routes the audio stream to the telephony system 654 (operation 670). The telephony system 654 performs ASR processing to detect recorded audio data in the audio stream, identify the IVR menu options, and create the GUI keypad with keys associated with the IVR menu options from the audio stream, and routes the GUI keypad with keys associated with the IVR menu options to the device 652 (operation 672). In some cases, the keys of the GUI keypad are sent to the device 652 one at a time as they are identified by the ASR processing. In other cases, the GUI keypad is sent to the device 652 as a whole, which may be determined by the end of ASR processing. In some instances, the end of ASR processing may be determined by a threshold period of silence elapsing during processing.

In some implementations, each key of the GUI keypad that is associated with an IVR menu option may include text, a text box, an image including the text, or other visualization of the content of the identified IVR menu option. In some implementations, the telephony system 654 stores the GUI keypad with keys associated with the IVR menu options, to resend the IVR menu options to the device 652 during the current call or to send the IVR menu options to the device 652 or a different client device for a separate call placed to the same destination 658.

In some implementations, before the GUI keypad is sent to the device 652, a determination is made of the capabilities of the device 652. For example, a determination may be made whether the device 652 can display the GUI keypad with keys associated with the IVR menu options or whether the device 652 is capable of displaying a video or an image. In a situation where the device 652 cannot display the GUI keypad, the telephony system 654 may identify another device associated with the caller and that is known to the telephony system 654 to be able to display the GUI keypad. This identification and association may be based on matching operator name information or other information associated with the device 652. In such a case, the GUI keypad is output for display at the other device instead of at the device 652. In a situation where the device 652 can display a video, the output to the device 652 may be in video form if such video form was generated based on the identified IVR menu options.

After the GUI keypad has been output to the display of the device 652, an operator of the device 652 selects one of the menu options. The menu selection is transmitted from the device 652 to the external telephony system 656 (operation 674) and transmitted from the external telephony system 656 to the destination 658 (operation 676). In some implementations, the menu selection is transmitted from the device 652 to the telephony system 654, transmitted from the telephony system 654 to the external telephony system 656, and transmitted from the external telephony system 656 to the destination 658.

Figure 7A:
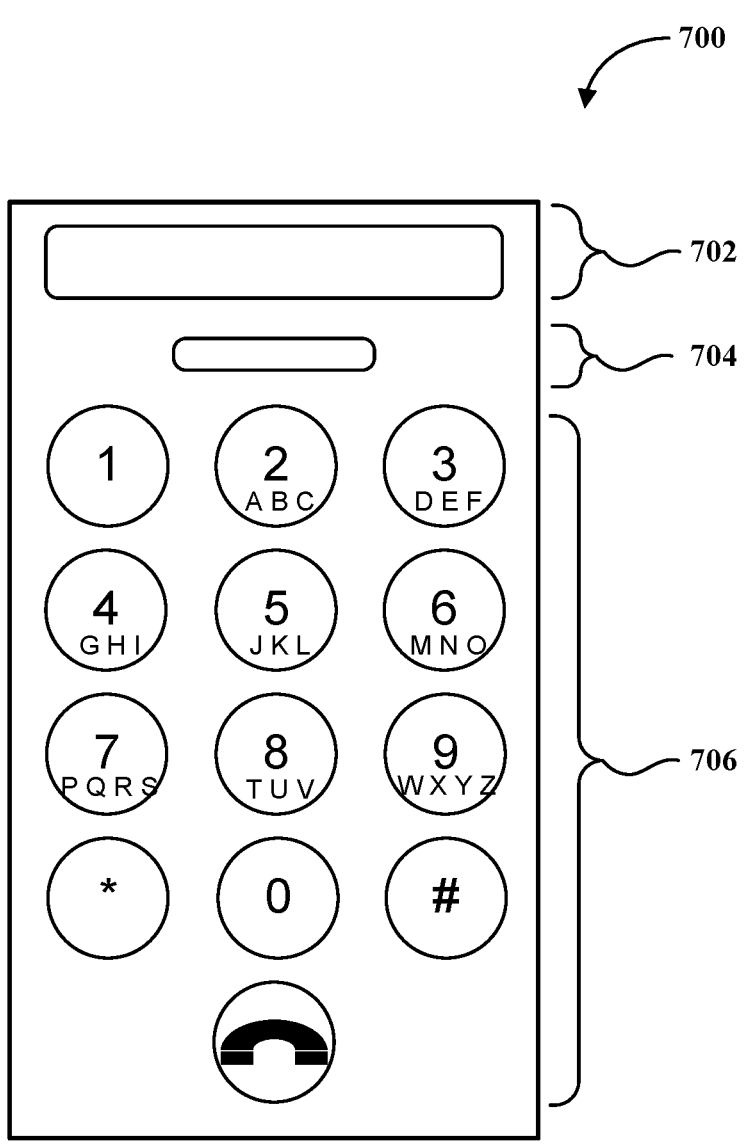
FIG. 7A is a diagram of an example of a typical GUI keypad.

FIG. 7A is a diagram of an example of a typical GUI keypad 700. The GUI keypad 700 includes a first display portion 702, a second display portion 704, and a keypad portion 706. The first display portion 702 may be configured to display a caller identification (ID), information associated with a destination, or other information associated with the call. The second display portion 704 may be configured to display an elapsed time of the call or other information associated with the call. The keypad portion 706 includes an alphanumeric keypad including keys numbered from 0 to 9 and some special function keys such as "*", "#", and connect/disconnect (shown as a handset symbol). As shown in FIG. 7A, the keys numbered from 2 through 9 include three or four letters associated with the alphabet from A-Z.

Figure 7B:
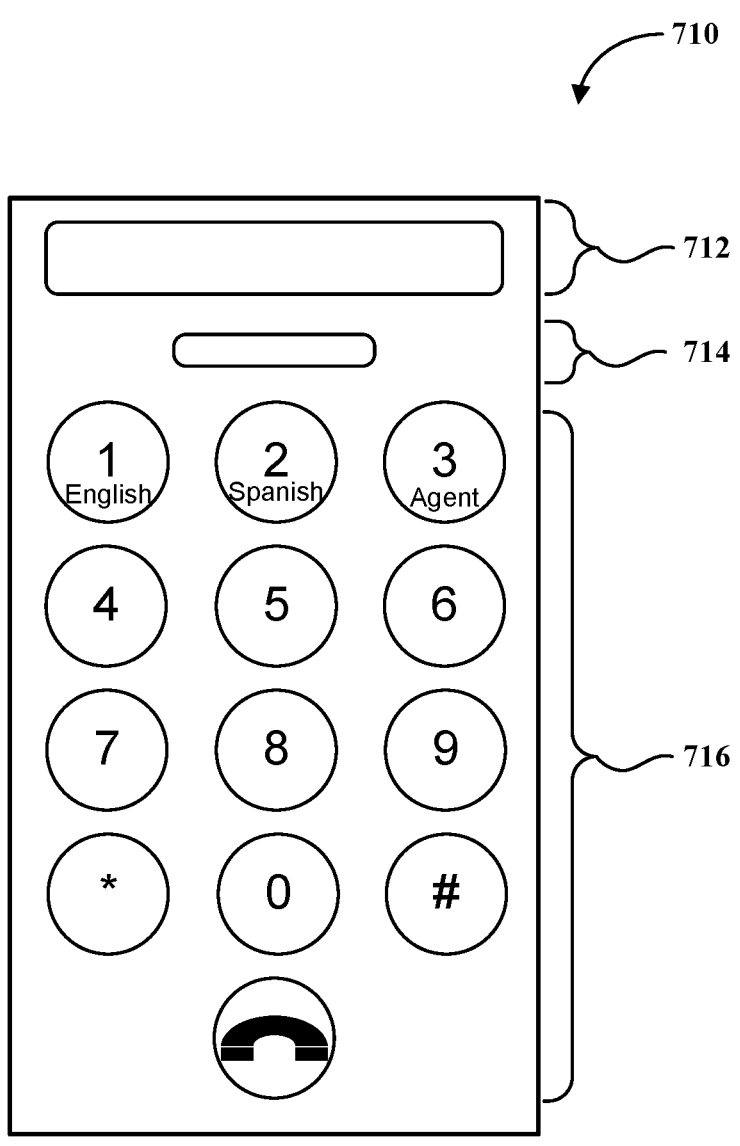
FIG. 7B is a diagram of an example of a GUI keypad in accordance with embodiments of this disclosure.

FIG. 7B is a diagram of an example of a GUI keypad 710 in accordance with embodiments of this disclosure. The GUI keypad 710 may be displayed on a device, such as the device 602 shown in FIG. 6A, the device 622 shown in FIG. 6B, or the device 652 shown in FIG. 6C. Referring to FIG. 7B, the GUI keypad 710 is generated based on one or more identified IVR menu options in an audio stream from a destination. The GUI keypad 710 includes a first display portion 712, a second display portion 714, and a keypad portion 716. In some examples, the GUI keypad 710 may include additional display portions, and in other examples, one or more of the first display portion 712 and the second display portion 714 may not be present. The first display portion 712 may be configured to display a caller ID, information associated with a destination, or other information associated with the call. The second display portion 714 may be configured to display an elapsed time of the call or other information associated with the call. The keypad portion 716 includes an alphanumeric keypad including keys numbered from 0 to 9 and some special function keys such as "*", "#", and connect/disconnect (shown as a handset symbol). In this example, the keys numbered from 1 to 3 include information associated with the identified IVR menu options. The keys including numbers 0 and 4 through 9 in this example are not associated with IVR menu options and therefore do not include any additional text or images. In some examples, the keys including numbers 0 and 4 through 9 may not be displayed when they are not associated with IVR menu options to reduce clutter on the display. In an example, an operator of a client device configured to display the GUI keypad 710 may select 1 for English, 2, for Spanish, or 3 to be transferred to an agent.

Figure 8:
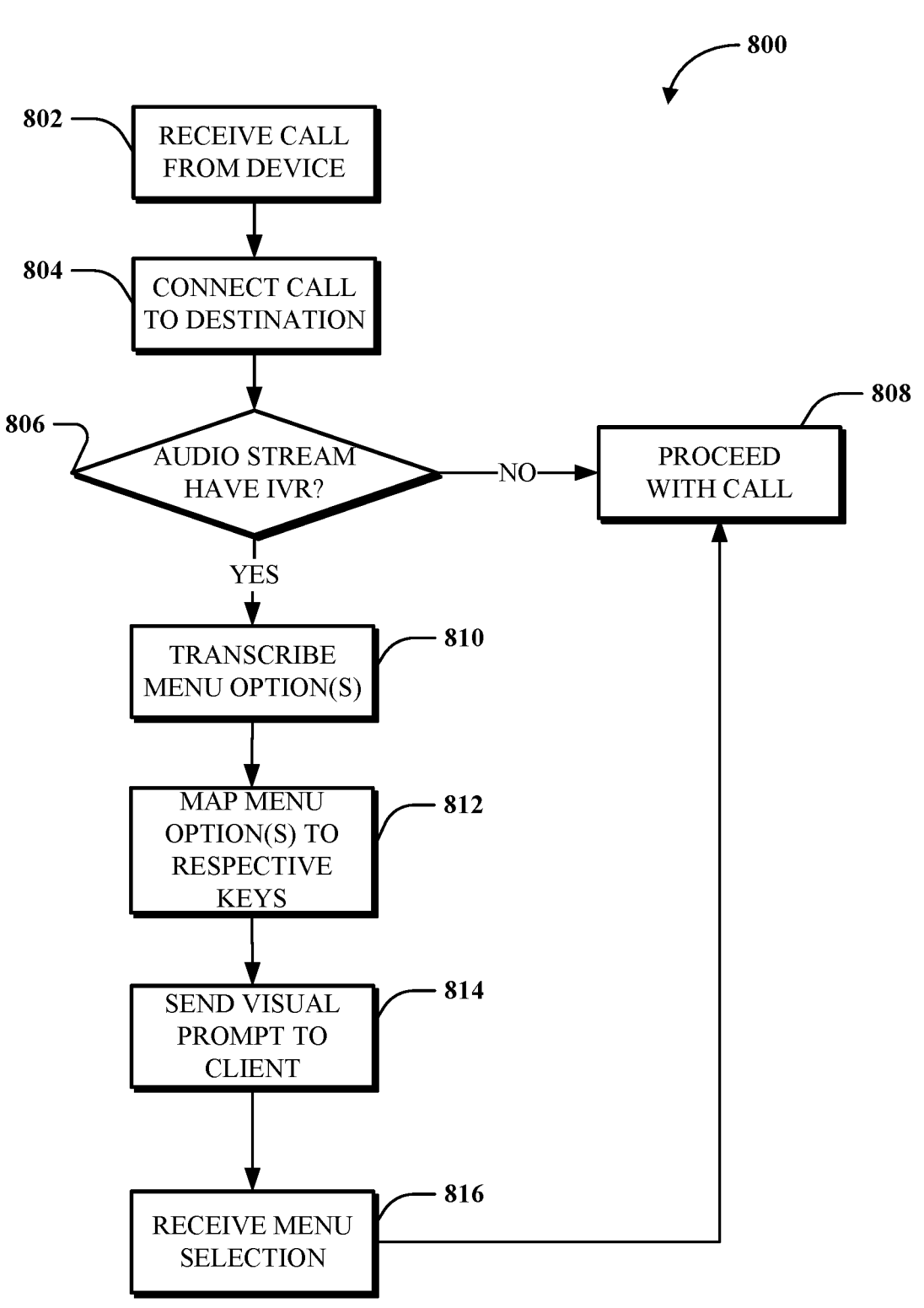
FIG. 8 is a flowchart of an example of a method performed by a telephony system for receiving an audio stream and displaying a GUI keypad with keys that are associated with IVR menu options.
Figure 9:
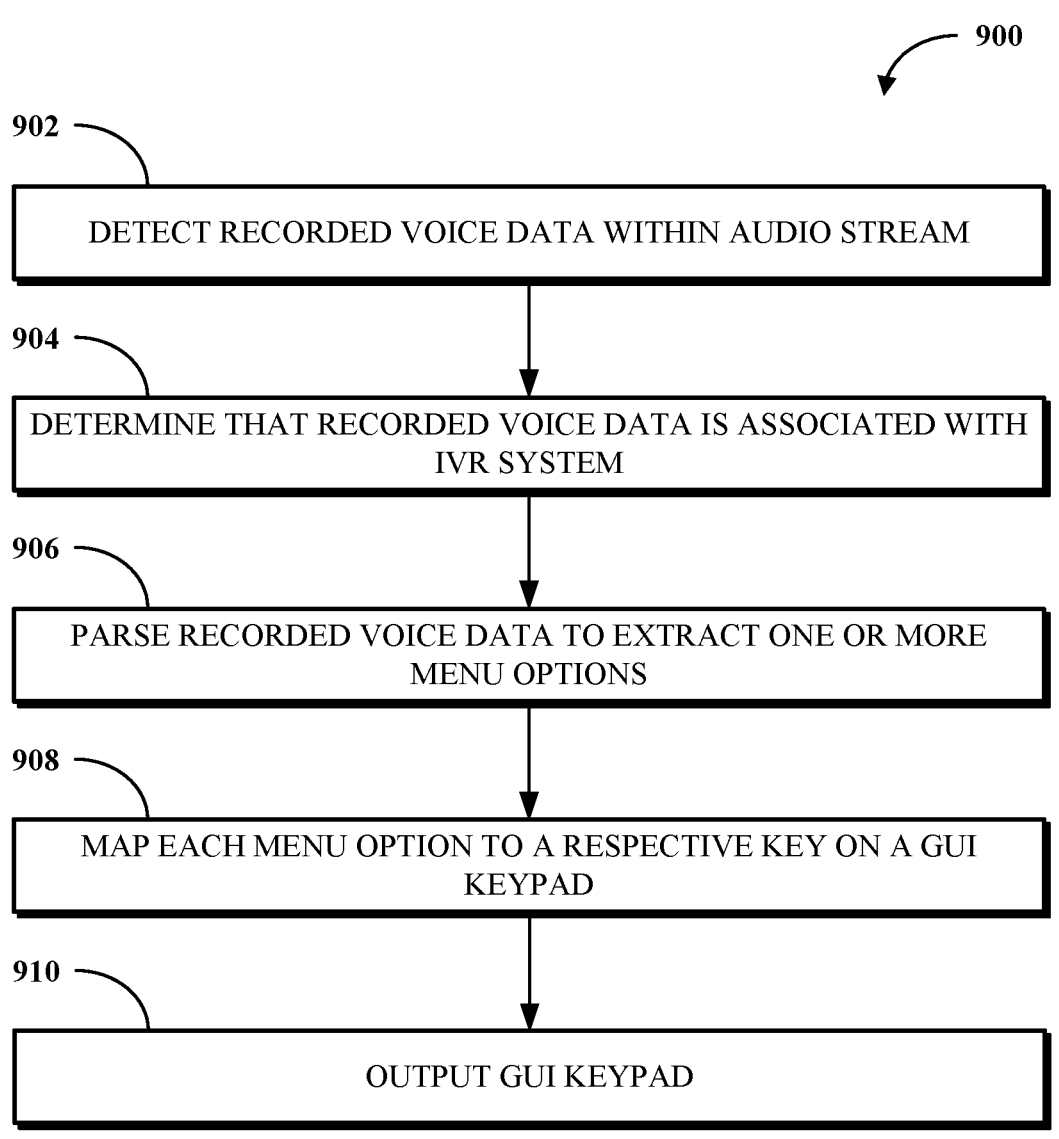
FIG. 9 is a flowchart of an example of a method performed by a telephony system for detecting recorded voice data within an audio stream and outputting a GUI keypad with keys that are associated with IVR menu options.

To further describe some implementations in greater detail, reference is next made to examples of methods that may be performed by or using a system for generating and transmitting a GUI keypad with keys associated with an IVR menu. FIGS. 8 and 9 are flowcharts of examples of methods for generating a GUI keypad with keys associated with an IVR menu. The methods can be executed using computing devices, such as the systems, hardware, and software described with respect to FIGS. 1-7B. The methods can be performed, for example, by executing a machine-readable program or other computer-executable instructions, such as routines, instructions, programs, or other code. The steps, or operations, of the methods, or another technique, method, process, or algorithm described in connection with the implementations disclosed herein can be implemented directly in hardware, firmware, software executed by hardware, circuitry, or a combination thereof.

For simplicity of explanation, the methods are depicted and described herein as a series of steps or operations. However, the steps or operations of the methods in accordance with this disclosure can occur in various orders and/or concurrently. Additionally, other steps or operations not presented and described herein may be used. Furthermore, not all illustrated steps or operations may be required to implement a technique in accordance with the disclosed subject matter.

FIG. 8 is a flowchart of an example of a method 800 performed by a telephony system for receiving an audio stream and displaying a GUI keypad with keys that are associated with IVR menu options. The method 800 may, for example, be performed by the telephony system 604 of FIG. 6A or by the telephony system 624 of FIG. 6B. Referring to FIG. 8, the telephony system receives a call from a device (operation 802). The telephony system connects the call to a destination (operation 804). In the implementation shown in FIG. 6A, the telephony system 604 connects the call directly to the destination 606. In the implementation shown in FIG. 6B, the telephony system 624 connects the call to the destination 628 by routing the call through the external telephony system 626 to the destination 628.

A determination is made whether the audio stream received by the telephony system from the destination includes any IVR menu options (operation 806). If the audio stream does not include any IVR menu options (operation 806, "no" branch), the telephony system routes the audio stream to the client device to proceed with the call (operation 808).

If the audio stream includes IVR menu options (operation 806, "yes" branch), the telephony system transcribes the one or more IVR menu options via ASR processing (operation 810). The telephony system maps the one or more menu options to respective keys on a GUI keypad (operation 812) based on the transcription. For example, if the transcription indicates "Press 2 for Spanish", the telephony system will map "Spanish" to the number 2 key of the GUI keypad. The telephony system may use keyword detection to map the one or more menu options to the respective keys on the GUI keypad. For example, the telephony system may detect a keyword such as "Press", "Select", or another keyword within a neighboring word range (e.g., within one to five words) of a number or symbol (e.g. "*" or "#") to determine that the phrase includes an IVR menu option. The telephony system may use one or more ML (e.g., supervised or unsupervised learning) or AI (e.g., natural language processing or deep learning) techniques to map the one or more IVR menu options to the respective keys on the GUI keypad. The telephony system generates and sends a GUI keypad corresponding to the one or more transcribed IVR menu options to the device (operation 814). The telephony system receives a menu selection from the device (operation 816) and proceed with the call (operation 808) in accordance with the menu selection. Using the example above, if the menu selection is "2", the call will proceed in Spanish.

FIG. 9 is a flowchart of an example of a method 900 performed by a telephony system for detecting recorded voice data within an audio stream and outputting a GUI keypad with keys that are associated with IVR menu options. At operation 902, the telephony system detects recorded voice data within an audio stream from a destination during a call between the destination and a client device. The destination may be a contact center device, such as a server at a contact center. The server may be a hardware server or it may be implemented using software. In some scenarios, the server may be at a different location than the contact center.

At operation 904, the telephony system determines that the recorded voice data is associated with an IVR system. The telephony system may determine that the recorded voice data is associated with an IVR system using an AI model to detect a speech pattern of the IVR system.

At operation 906, the telephony system parses the recorded voice data associated with the IVR system to extract one or more IVR menu options. The one or more IVR menu options may be associated with an IVR tree of the IVR system. The telephony system may use keyword detection to parse the recorded voice data.

At operation 908, the telephony system maps each IVR menu option to a respective key on a GUI keypad. The telephony system may use keyword detection to map the one or more menu options to the respective keys on the GUI keypad as described with reference to FIG. 8 above. The GUI keypad may be generated to mirror an existing keypad and create annotation-like overlays. The keys may be expressed using data stored in a metadata or extensible markup language (XML) file that is accessed to populate the keys.

At operation 910, the telephony system outputs instructions for mapping the keys to IVR menu options and rendering the GUI keypad to a device for display on the device. The GUI keypad includes a textual representation of each IVR menu option on a respective key. In some examples, the GUI keypad may include a visual representation, such as an image, representing one or more of the IVR menu options on a respective key.

In some examples, the telephony system may detect that the voice data in the audio stream is associated with a live agent. Based on the detection that the voice data is associated with a live agent, the telephony system may terminate a monitoring of the audio stream. In another example, the telephony system may output a GUI keypad that does not include the textual representation of the one or more IVR menu options based on the detection that the voice data is associated with a live agent. In some examples, the telephony system may associate the IVR tree with the destination. The telephony system may store data representative of the IVR tree for use with future calls to the destination.

An aspect may include a method that includes detecting recorded voice data within an audio stream from a contact center device during a call between the contact center device and a user device. The method may include determining that the recorded voice data is associated with an IVR system. The method may include parsing the recorded voice data associated with the IVR system to extract one or more options of an IVR tree of the IVR system. The method may include mapping each of the one or more options of the IVR tree to a respective key on a GUI keypad. The method may include outputting the GUI keypad to the user device, wherein the GUI keypad includes a textual representation of each option on a respective key.

An aspect may include a system that comprises a memory subsystem storing instructions and processing circuitry. The processing circuitry may be configured to detect recorded voice data within an audio stream from a contact center device during a call between the contact center device and a user device. The processing circuitry may be configured to determine that the recorded voice data is associated with an IVR system. The processing circuitry may be configured to parse the recorded voice data associated with the IVR system to extract one or more options of an IVR tree of the IVR system. The processing circuitry may be configured to map each of the one or more options of the IVR tree to a respective key on a GUI keypad. The processing circuitry may be configured to output the GUI keypad to the user device, wherein the GUI keypad includes a textual representation of each option on a respective key.

An aspect may include a non-transitory computer-readable medium comprising instructions that when executed by a processor, cause the processor to perform operations. The operations may include detecting recorded voice data within an audio stream from a contact center device during a call between the contact center device and a user device. The operations may include determining that the recorded voice data is associated with an IVR system. The operations may include parsing the recorded voice data associated with the IVR system to extract one or more options of an IVR tree of the IVR system. The operations may include mapping each of the one or more options of the IVR tree to a respective key on a GUI keypad. The operations may include outputting the GUI keypad to the user device, wherein the GUI keypad includes a textual representation of each option on a respective key.

In one or more aspects, determining that the recorded voice data is associated with the IVR system may include detecting a speech pattern of the IVR system. In one or more aspects, determining that the recorded voice data is associated with the IVR system may include using an AI model to detect a speech pattern of the IVR system. In one or more aspects, parsing the recorded voice data may include performing keyword detection. In one or more aspects, voice data associated with a live agent in the audio stream may be detected. In one or more aspects, monitoring of the audio stream may be terminated based on the detected voice data. In one or more aspects, the GUI keypad may be output to the user device based on the detected voice data, wherein the GUI keypad does not include the textual representation of each option on a respective key. In one or more aspects, the IVR tree may be associated with the contact center. In one or more aspects, data representative of the IVR tree may be stored. In one or more aspects, keyword detection may be performed to map each of the one or more options of the IVR tree. In one or more aspects, the GUI keypad may include only keys that are associated with the one or more options of the IVR tree. In one or more aspects, determining that the recorded voice data is associated with the IVR system may include using a natural language processing model to detect a speech pattern of the IVR system. In one or more aspects, determining that the recorded voice data is associated with the IVR system may include using a deep learning model to detect a speech pattern of the IVR system. In one or more aspects, parsing the recorded voice data may include performing keyword detection. In one or more aspects, a machine learning model may be trained using the stored data representative of the IVR tree.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    detecting recorded voice data within an audio stream from a contact center device during a call between the contact center device and a user device;
    determining that the recorded voice data is associated with an interactive voice response (IVR) system;
    parsing the recorded voice data associated with the IVR system to extract one or more options of an IVR tree of the IVR system;
    mapping each of the one or more options of the IVR tree to a respective key on a graphical user interface (GUI) keypad that mirrors an existing standard telephone keypad layout and includes keys associated with the one or more options of the IVR tree and omits keys that are not associated with the one or more options of the IVR tree; and
    outputting the GUI keypad to the user device, wherein the GUI keypad includes an overlay keyword of each option on a respective key.

2. The method of claim 1, wherein determining that the recorded voice data is associated with the IVR system includes detecting a speech pattern of the IVR system.

3. The method of claim 1, wherein determining that the recorded voice data is associated with the IVR system includes using an artificial intelligence (AI) model to detect a speech pattern of the IVR system.

4. The method of claim 1, wherein parsing the recorded voice data comprises performing keyword detection.

5. The method of claim 1, further comprising:
    detecting voice data associated with a live agent in the audio stream; and
    terminating a monitoring of the audio stream based on the detected voice data.

6. The method of claim 1, further comprising:
    detecting voice data associated with a live agent in the audio stream; and
    outputting the GUI keypad to the user device based on the detected voice data, wherein the GUI keypad does not include the overlay keyword of each option on a respective key.

7. The method of claim 1, further comprising:
    associating the IVR tree with the contact center; and
    storing data representative of the IVR tree.

8. A system, comprising:
    a memory subsystem storing instructions; and
    processing circuitry configured to:
        detect recorded voice data within an audio stream from a contact center device during a call between the contact center device and a user device;
        determine that the recorded voice data is associated with an interactive voice response (IVR) system;
        parse the recorded voice data associated with the IVR system to extract one or more options of an IVR tree of the IVR system;
        map each of the one or more options of the IVR tree to a respective key on a graphical user interface (GUI) keypad that mirrors an existing standard telephone keypad layout and includes keys associated with the one or more options of the IVR tree and omits keys that are not associated with the one or more options of the IVR tree; and
        output the GUI keypad to the user device, wherein the GUI keypad includes a an overlay keyword of each option on a respective key.

9. The system of claim 8, wherein the processing circuitry is configured to detect a speech pattern of the IVR system.

10. The system of claim 8, wherein the processing circuitry is configured to use an artificial intelligence (AI) model to detect a speech pattern of the IVR system.

11. The system of claim 8, wherein the processing circuitry is configured perform keyword detection to map each of the one or more options of the IVR tree.

12. The system of claim 8, wherein the processing circuitry is further configured to:
    detect voice data associated with a live agent in the audio stream.

13. The system of claim 8, wherein the processing circuitry is further configured to:
    terminate a monitoring of the audio stream when the voice data is associated with a live agent.

14. The system of claim 8, wherein the processing circuitry is further configured to:
    output the GUI keypad when the voice data is associated with a live agent, wherein the GUI keypad does not include the overlay keyword of each option on a respective key.

15. The system of claim 8, wherein the GUI keypad includes only keys that are associated with the one or more options of the IVR tree.

16. A non-transitory computer-readable medium comprising instructions that when executed by a processor, cause the processor to perform operations comprising:

detecting recorded voice data within an audio stream from a contact center device during a call between the contact center device and a user device;

determining that the recorded voice data is associated with an interactive voice response (IVR) system;

parsing the recorded voice data associated with the IVR system to extract one or more options of an IVR tree of the IVR system;

mapping each of the one or more options of the IVR tree to a respective key on a graphical user interface (GUI) keypad that mirrors an existing standard telephone keypad layout and includes keys associated with the one or more options of the IVR tree and omits keys that are not associated with the one or more options of the IVR tree; and outputting the GUI keypad to the user device, wherein the GUI keypad includes an overlay keyword of each option on a respective key.

17. The non-transitory computer-readable medium of claim 16, wherein determining that the recorded voice data is associated with the IVR system includes using a natural language processing model to detect a speech pattern of the IVR system.

18. The non-transitory computer-readable medium of claim 16, wherein determining that the recorded voice data is associated with the IVR system includes using a deep learning model to detect a speech pattern of the IVR system.

19. The non-transitory computer-readable medium of claim 16, wherein parsing the recorded voice data comprises performing keyword detection.

20. The non-transitory computer-readable medium of claim 16, further comprising:

associating the IVR tree with the contact center;

storing data representative of the IVR tree; and training a machine learning model using the stored data representative of the IVR tree.

* * * * *